US010187563B2

(12) United States Patent
Deleule

(10) Patent No.: US 10,187,563 B2
(45) Date of Patent: Jan. 22, 2019

(54) METHOD OF SETTING A FOCUS TO ACQUIRE IMAGES OF A MOVING OBJECT AND CORRESPONDING DEVICE

(71) Applicant: STMicroelectronics (Grenoble 2) SAS, Grenoble (FR)

(72) Inventor: Arnaud Deleule, Grenoble (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 148 days.

(21) Appl. No.: 14/985,641

(22) Filed: Dec. 31, 2015

(65) Prior Publication Data
US 2017/0104917 A1   Apr. 13, 2017

(30) Foreign Application Priority Data

Oct. 12, 2015 (FR) .................... 15 59666

(51) Int. Cl.
| | | |
|---|---|---|
| H04N 5/232 | (2006.01) | |
| G01S 17/58 | (2006.01) | |
| G01S 7/08 | (2006.01) | |
| G02B 7/40 | (2006.01) | |

(52) U.S. Cl.
CPC ........... *H04N 5/23212* (2013.01); *G01S 7/08* (2013.01); *G01S 17/58* (2013.01); *G02B 7/40* (2013.01); *H04N 5/23209* (2013.01)

(58) Field of Classification Search
CPC . G01S 17/08; H04N 5/23212; H04N 5/23209
See application file for complete search history.

(56) References Cited

U.S. PATENT DOCUMENTS

| | | | |
|---|---|---|---|
| 2006/0034598 A1 | 2/2006 | Stavely et al. | |
| 2011/0141344 A1* | 6/2011 | Abe ..................... | G03B 3/00 348/345 |
| 2011/0243546 A1* | 10/2011 | Pace .................... | H04N 5/2251 396/428 |
| 2011/0305446 A1* | 12/2011 | Itoh ..................... | G03B 13/36 396/95 |
| 2014/0307126 A1* | 10/2014 | Son ..................... | H04N 5/23212 348/231.6 |
| 2015/0223733 A1* | 8/2015 | Al-Alusi ............. | A61B 5/0507 600/479 |
| 2015/0281553 A1* | 10/2015 | Ogura ................. | G02B 7/09 348/348 |

FOREIGN PATENT DOCUMENTS

| | | |
|---|---|---|
| FR | 2 503 958 A1 | 10/1982 |
| JP | 2001-021794 A | 1/2001 |
| JP | 2008-276214 A | 11/2008 |

\* cited by examiner

*Primary Examiner* — Sinh Tran
*Assistant Examiner* — Selam Gebriel
(74) *Attorney, Agent, or Firm* — Seed IP Law Group LLP

(57) ABSTRACT

At least one image of a moving object is acquired using an image acquisition device equipped with an automatic focussing system. A distance between the object and the device when the effective acquisition of the image occurs is estimated based on the estimated speed and on the period of time separating a time of actuation triggering the process for acquiring the at least one image from the time of acquisition of the said effective acquisition, and the taking into account of the said distance by the automatic focussing system.

23 Claims, 3 Drawing Sheets

METHOD OF SETTING A FOCUS TO ACQUIRE IMAGES OF A MOVING OBJECT AND CORRESPONDING DEVICE

BACKGROUND

Technical Field

The present disclosure relates to the acquisition of images, and more particularly devices for acquiring images of at least one moving object, in particular equipped with an automatic focusing system, which may be incorporated for example into electronic devices of the tablet or cellular mobile telephone type.

Description of the Related Art

Conventionally, the focusing of image acquisition devices is based on the analysis of images, for example using a measurement of contrast for the majority of compact devices, or using a detection of phase for top-of-the-range devices that often demand a high level of performance in certain situations such as for example for photographing rapidly moving objects.

In general, the final decision on the focusing is taken by means of the analysis of the last image being processed received by the device prior to the activation of the command for acquiring images. Despite the progress in the techniques notably as regards the start-up and the reactivity of image acquisition devices, there still exists a time delay between the time of determination of the focusing and the time of the effective acquisition of the image.

In other words, the focusing is generally always late with respect to the effective acquisition of images, and this is all the more true when the objects to be photographed are moving at a high speed.

The acquisition of a sharp image of such a rapidly moving object by compact devices or mobile telephones is therefore a real challenge.

BRIEF SUMMARY

In an embodiment, a method comprises: estimating, using an image acquisition device, a speed of a moving object; estimating, by the image acquisition device, a distance between the image acquisition device and the moving object at an effective image acquisition time based on the estimated speed of the moving object and a period of time between a time of activation of an image acquisition cycle of the image acquisition device and the effective image acquisition time; setting, by the image acquisition device, a focus of the image acquisition device based on the estimated distance; and acquiring, by the image acquisition device, an image of the moving object at the effective acquisition time using the focus set by the image acquisition device. In an embodiment, the estimating the speed of the moving object comprises measuring distances using at least one time-of-flight distance sensor of the image acquisition device. In an embodiment, the method comprises acquiring, using the image acquisition device, a plurality of images of the moving object. In an embodiment, the method comprises: responding to a command to auto-focus the image acquisition device by estimating a speed of a moving object. In an embodiment, setting the focus of the image acquisition device comprises setting a position of at least one lens of objective optics of the image acquisition device. In an embodiment, the period of time is a constant.

In an embodiment, a device comprises: one or more inputs and one or more outputs; and circuitry, coupled to at least one of the one or more inputs and to at least one of the one or more outputs, and which, in operation: estimates a speed of a moving object with respect to the device; estimates a distance between the device and the moving object at an effective image acquisition time based on the estimated speed of the moving object and a period of time between a time of activation of an image acquisition cycle and the effective image acquisition time; and sets a focus to acquire an image of the moving object based on the estimated distance. In an embodiment, the device comprises: objective optics including at least one lens, wherein circuitry sets the focus by outputting a control signal to set a position of the at least one lens. In an embodiment, the device comprises: image acquisition circuitry, which, in one mode of operation, acquires images of moving objects; and an actuator, which, in operation, actuates an image acquisition cycle of the image acquisition circuitry. In an embodiment, the device comprises at least one time-of-flight distance sensor, wherein the circuitry, in operation, estimates the speed of the moving object based on distances measured by the at least one time-of-flight sensor. In an embodiment, the circuitry, in operation, estimates the speed of the moving object based on distances between the moving object and the objective optics determined by the at least one time-of-flight sensor at a plurality of times, at least one of which precedes the time of activation. In an embodiment, the at least one lens comprises a first field of view and the at least one sensor comprises a second field of view covering at least one third of the first field of view. In an embodiment, the at least one sensor has a maximum range of detection, the image acquisition circuitry comprises a motor having a plurality of states of progression each corresponding to a range of focussing of the objective optics, and the maximum range of the said at least one sensor is at least 65% of the maximum range of focussing of the objective optics. In an embodiment, the device comprises at least one of: a touch screen; and mobile telephone circuitry.

In an embodiment, a system comprises: image acquisition circuitry, which, in operation, acquires images of objects; objective optics including at least one lens; and auto-focus circuitry, which, in operation: estimates a speed of a moving object relative to the objective optics; estimates a distance between the objective optics and the moving object at an effective image acquisition time based on the estimated speed of the moving object and a period of time between a time of activation of an image acquisition cycle of the image acquisition circuitry and the effective image acquisition time; and sets a focus of the at least one lens based on the estimated distance. In an embodiment, the system comprises: at least one time-of-flight distance sensor, wherein the auto-focus circuitry, in operation, estimates the speed of the moving object based on distances measured by the at least one time-of-flight sensor. In an embodiment, the circuitry, in operation, estimates the speed of the moving object based on distances between the moving object and the objective optics determined by the at least one time-of-flight sensor at a plurality of times, at least one of which precedes the time of activation. In an embodiment, the system comprises at least one of: a touch screen; and mobile telephone circuitry.

In an embodiment, a computer-readable memory medium's contents, when executed by an image acquisition device, cause the image acquisition device to perform a method, the method comprising: estimating a speed of a moving object in a field of view of the image acquisition device; estimating a distance between the image acquisition device and the moving object at an effective image acquisition time based on the estimated speed of the moving object and a period of time between a time of activation of an image acquisition cycle of the image acquisition device and the effective image acquisition time; setting a focus of the image acquisition device based on the estimated distance; and acquiring an image of the moving object at the effective acquisition time using the focus set by the image acquisition device. In an embodiment, the estimating the speed of the moving object comprises measuring distances using at least one time-of-flight distance sensor of the image acquisition device. In an embodiment, the setting the focus of the image acquisition device comprises setting a position of at least one lens of objective optics of the image acquisition device.

According to an embodiment, a method and a device are provided for acquisition of at least one image of a moving object by means of an image acquisition device equipped with an automatic focusing system allowing the focusing of the object to be improved by means of a prediction of its positioning during the effective acquisition of the image, and this is based on an estimation of the speed of the object using at least one sensor of the ToF ("Time of Flight") type.

In an embodiment, a method is provided for acquisition of at least one image of a moving object by means of an image acquisition device equipped with an automatic focusing system. The said method comprises an estimation of the speed of movement of the object;

a determination of the distance between the object and the device when the effective acquisition of the image occurs based on the estimated speed and on the period of time separating a time of actuation (for example pressing a button of the photographic device or tapping an icon on the screen of a "Smart Phone") triggering the process for acquiring the said at least one image from the time of acquisition of the said effective acquisition; and the taking into account of the said distance by the automatic focusing system.

In an embodiment, the speed of the object may be estimated by means of distances obtained by at least one sensor based on the time-of-flight principle, commonly known by those skilled in the art under the acronym "ToF".

In an embodiment, a device is provided for acquiring images, comprising objective optics comprising at least one lens;

a means for acquiring images;

a triggering means able to be actuated allowing the said acquisition means to be activated; and an automatic focusing system configured for controlling the positioning of the said at least one lens.

In an embodiment, the image acquisition device furthermore comprises control means comprising estimation means configured for estimating the speed of a moving object of which it is desired to acquire at least one image and calculation means configured for determining, from the said estimated speed and from the period of time separating the time of actuation of the triggering means from the time of acquisition of the said at least one image by the acquisition means, the distance between the object and the objective optics at the said acquisition time.

The automatic focusing system is then configured for controlling the position of the said at least one lens taking into account this determined distance.

According to one embodiment, the estimation means comprise at least one sensor based on the time-of-flight principle and having a maximum detection range.

The estimation means can be configured for estimating the speed of the object, for example based on distances between the object and the objective optics determined by the said at least one sensor at times at least one of which precedes the time of actuation.

According to an embodiment, the said at least one lens comprises a first field of view and the said at least one sensor comprises a second field of view covering at least one third of the said first field of view.

According to an embodiment, the image acquisition means comprises a motor having a plurality of states of progression each corresponding to a focusing range of the objective optics, and the maximum range of the said at least one sensor is equal to at least 65% of the maximum focusing range, or hyperfocal distance, of the objective optics.

In an embodiment, an electronic device is provided, for example of the tablet or cellular mobile telephone type, incorporating an image acquisition device such as defined hereinbefore.

BRIEF DESCRIPTION OF THE SEVERAL VIEWS OF THE DRAWINGS

One or more embodiments will now be described, purely by way of non-limiting example, with reference to the annexed figures, wherein.

DETAILED DESCRIPTION

In the ensuing description, numerous specific details are provided in order to facilitate as much as possible understanding of the embodiments provided by way of example. The embodiments may be implemented with or without specific details, or else with other methods, components, materials, etc. In other cases, structures, materials, or operations that are well known are not shown or described in detail so that aspects of the embodiments will not be obscured. Reference in the framework of the present description to "an embodiment" or "one embodiment" means that a given peculiarity, structure, or characteristic described in connection with the embodiment is comprised in at least one embodiment. Hence, recurrence of phrases such as "in an embodiment" or "in one embodiment" in various points of the present description does not necessarily refer to one and the same embodiment. Moreover, the peculiarities, structures, or characteristics may be combined in any convenient way in one or more embodiments.

The notations and references are here provided only for convenience of the reader and do not define the scope or the meaning of the embodiments.

Figure 1:
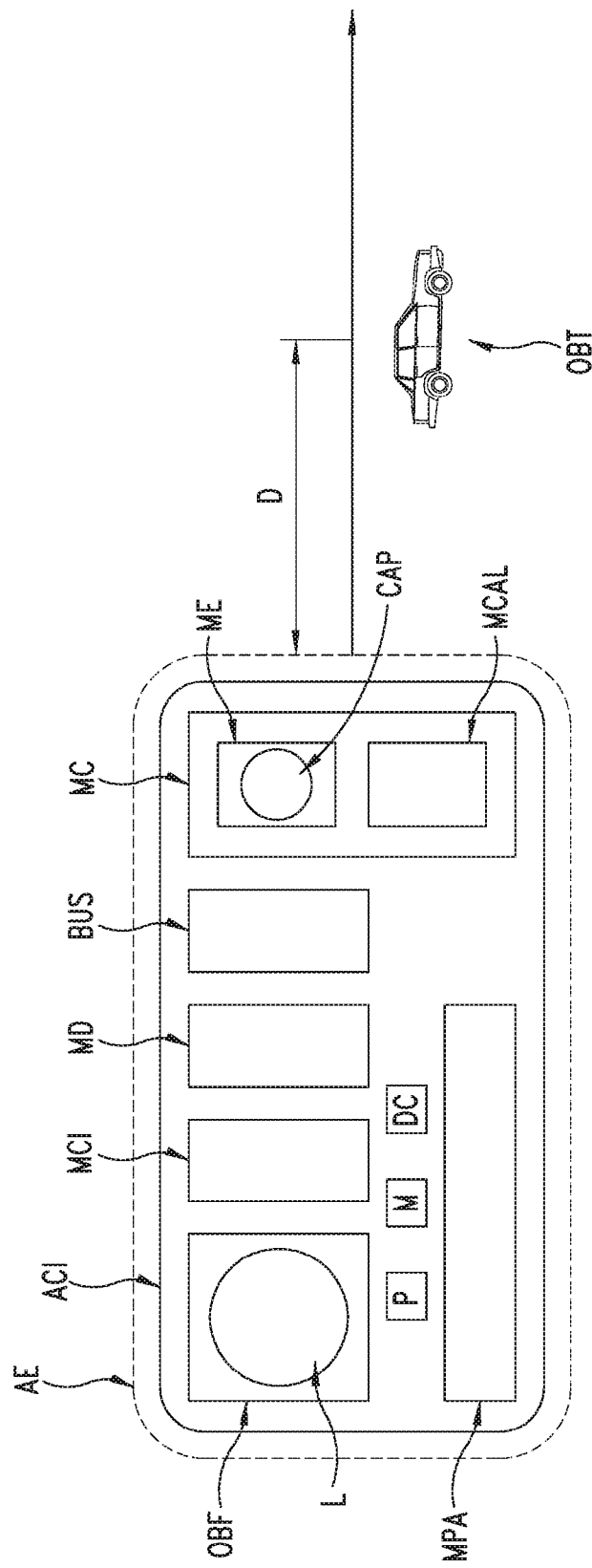
FIG. 1 is a functional block diagram of an embodiment of an electronic device.

FIG. 1 illustrates schematically an electronic device AE of the cellular mobile telephone type incorporating an image acquisition device ACI according to an embodiment.

The image acquisition device ACI comprises objective optics OBF including at least one lens L. For an improved optical performance, a plurality of different lenses may be used.

The image acquisition device ACI furthermore comprises an image acquisition circuit or circuitry MCI, for example a matrix of pixels associated with a microcontroller, a triggering device MD, which, in operation, is actuated (for example a push button or else an icon on the screen of the camera function of a cellular mobile telephone or of a tablet) allowing the said acquisition circuit MCI to be activated and an automatic focusing system MPA configured to control the positioning of the said at least one lens.

The focusing system MPA may be activated continuously and/or in response to the actuation of the triggering device MD depending on the configuration of the acquisition device ACI. An actuation of the triggering device MD causes the activation of the said acquisition circuit MCI, and leads, in this regard, to determining an estimated distance D between at least one object OBT, of which it is desired to acquire at least one image, and the objective optics OBF at the time of the effective acquisition of the image, controlling the focusing positioning of the said at least one lens L as a function of the distance D having been determined in such a manner as to carry out the acquisition of the image of the object OBT with an improved focusing, notably when the object is moving.

The image acquisition device ACI furthermore comprises a controller MC. The controller MC comprises an estimation block or circuitry ME configured to estimate the speed of the moving object and a calculation block or circuitry MCAL configured to perform a calculation of distances.

The blocks MC, ME and MCAL may be implemented in whole or in part as software modules incorporated within the microcontroller.

Furthermore, the estimation block ME comprises at least one sensor CAP based on the time-of-flight principle and having a maximum range of detection.

The structure and the operation of such a sensor are well-known to those skilled in the art.

The sensor CAP is configured to emit a light beam towards an object situated within the said maximum range of detection and calculates the return travel time of the beam between the sensor and the said at least one object. The "time-of-flight" of the said light beam is proportional to the distance between the sensor and the said at least one object.

The electronic device AE may comprise one or more processors P, one or more memories M, and discrete circuitry DC, which may be employed alone and in various combinations to implement the functionality of the electronic device AE. The electronic device AE also may comprise a bus system BUS to couple various inputs and outputs of the functional blocks of the electronic device together, for example, to couple outputs of the sensor CAP to inputs of the estimation block ME, to couple outputs of the controller MC to inputs of the focusing system MPA, etc.

Figure 2:
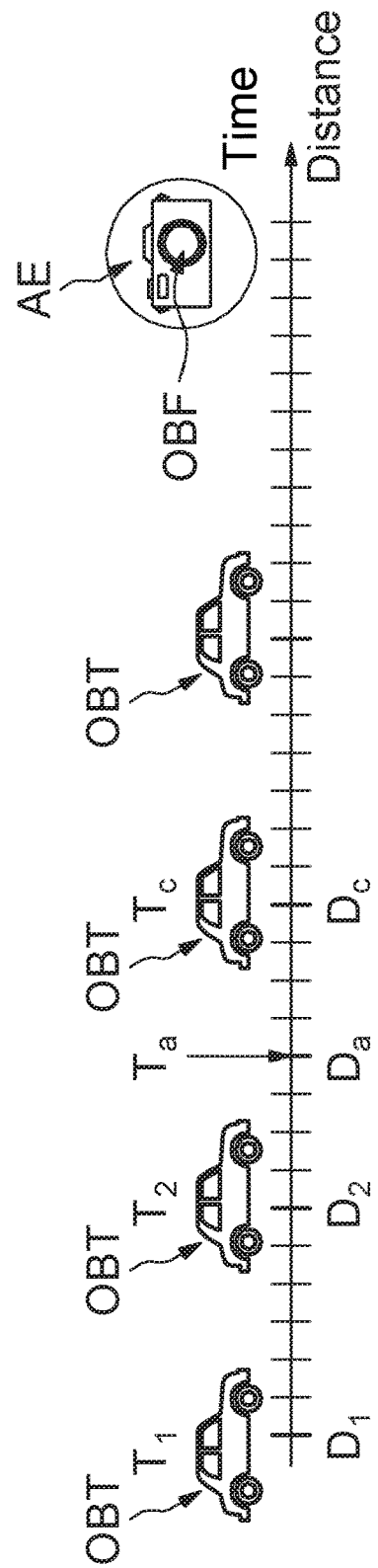
FIG. 2 is a timing diagram illustrating a focusing operation of an embodiment.

Reference is now made to FIG. 2 in order to illustrate, in more detail, the operation of the controller MC and of the estimation block ME and an acquisition of at least one image of a moving object OBJ, here a motor car, using the image sensor device ACI equipped with the automatic focusing system MPA.

The sensor CAP is configured to determine distances between the object OBT and the sensor (or the objective optics OBF) at a certain frequency, for example 30 Hz, which allows the estimation block ME to estimate the distance between the sensor and the said at least one object at various detection times, for example T1, T2, and to track the variation of this distance virtually in real time.

When, at the time of actuation $T_a$, the triggering device MD is actuated so as to send an image acquisition command, the estimation block ME is configured to estimate the speed of the object $V_{OBT}$ from distances between the object OBJ and the objective optics OBF determined by the said sensor CAP at times at least one of which precedes the time of actuation $T_a$.

By way of example, the times T2 and $T_a$ will be used, however the times T1 and T2 could have been used.

The speed of the object $V_{OBT}$ may then be determined using the formula below:

$$V_{OBT} = \frac{(D_2 - D_a)}{(T_2 - T_a)}$$

It should be noted that the speed of the object $V_{OBT}$ corresponds to the speed along the optical axis of the objective optics OBJ.

The calculation block MCAL is configured to determine, using the said estimated speed $V_{OBT}$ and the period of time separating the time of actuation $T_a$ from the time $T_c$ of effective acquisition, a known period since it depends on the characteristics of the device.

The distance $D_c$ between the object OBT and the objective optics OBJ at the said acquisition time $T_c$ can therefore be determined by the calculation block MCAL by applying the following formula:

$$D_c = D_2 + \frac{(D_2 - D_a)}{(T_2 - T_a)}(T_c - T_2)$$

The automatic focusing system MPA controls the positioning of the said at least one lens L taking into account the said distance $D_c$ having been determined.

An embodiment facilitates improving the sharpness of the acquired image, for example, when the object OBT is moving at speed.

Figure 3:
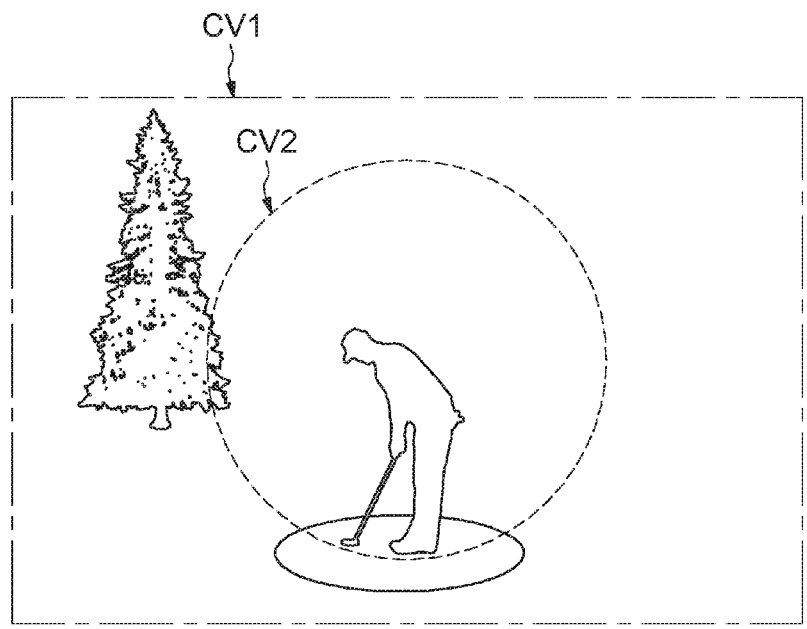
FIG. 3 illustrates a field of vision of the objective optics and a field of vision of a sensor of an embodiment.

It should be noted that the said at least one lens L comprises a first field of view CV1 and the said at least one sensor comprises a second field of view CV2, as illustrated in FIG. 3.

In order to increase the chances of success of the automatic focusing in an embodiment during the acquisition of the said at least one moving object OBT, the second field of view CV2 may be placed in the middle of the first field of view CV1 (FIG. 3).

In an embodiment, the second field of view CV2 may cover at least one third of the said first field of view CV1.

The image acquisition circuit MCI may comprise a motor MP for driving and controlling the progression of the said at least one lens L in such a manner as to implement the automatic focusing taking into account the said distance $D_c$ between the object OBT and the objective optics OBF at the said acquisition time $T_c$.

The said motor MP may be, for example, a mobile coil motor commonly known by those skilled in the art under the acronym "VCM" (for "Voice Coil Motor") and comprising a plurality of states of progression EA.

Figure 4:
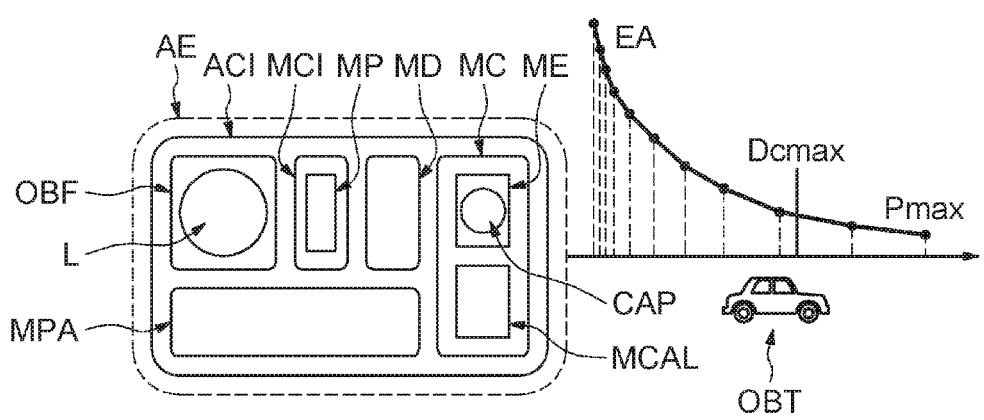
FIG. 4 illustrates a distribution of states of progression of a focusing motor in an embodiment.

Each state of progression EA corresponds to a focusing range P of the objective optics OBF. The density of distribution of the states of progression may not uniform as a function of the said range P. The closer the object to the objective optics OBF, the higher the density of distribution of the states of progression that may be employed (FIG. 4).

An embodiment facilitates a high level of performance of the automatic focusing by employing a sensor with the maximum range $D_{cmax}$ equal to at least 65% of the maximum range $P_{max}$ of the objective optics OBF.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   measuring a plurality of distances using at least one time-of-flight sensor of an image acquisition device;
   estimating, using the image acquisition device and during an image acquisition cycle of the image acquisition device, a speed of a moving object based on the plurality of distances measured using the at least one time-of-flight sensor of the image acquisition device, wherein an acquisition time of at least one of the measured plurality of distances precedes a time of activation of the image acquisition cycle;
   estimating, by the image acquisition device and during the image acquisition cycle, a distance between the image acquisition device and the moving object at an effective image acquisition time based on the estimated speed of the moving object and a period of time between the time of activation of the image acquisition cycle of the image acquisition device and the effective image acquisition time;
   setting, by the image acquisition device and during the image acquisition cycle, a focus of the image acquisition device based on the estimated distance; and
   acquiring, by the image acquisition device and during the image acquisition cycle, an image of the moving object at the effective acquisition time using the focus set by the image acquisition device.

2. The method of claim 1, comprising acquiring, using the image acquisition device, a plurality of images of the moving object.

3. The method of claim 1, comprising:
   responding to a command to auto-focus the image acquisition device by estimating a speed of a moving object.

4. The method of claim 1 wherein the setting the focus of the image acquisition device comprises setting a position of at least one lens of objective optics of the image acquisition device.

5. The method of claim 1 wherein the period of time is a constant.

6. The method of claim 1 wherein the image acquisition device comprises objective optics and a motor, the motor having a plurality of states of progression each corresponding to a focusing range of the objective optics.

7. The method of claim 6 wherein the at least one time-of-flight sensor has a maximum range of detection and the maximum range of detection of the at least one time-of-flight sensor is at least 65% of a maximum focusing range of the objective optics.

8. A device, comprising:
   one or more inputs and one or more outputs; and
   circuitry, coupled to at least one of the one or more inputs and to at least one of the one or more outputs, and which, during an image acquisition cycle:
     estimates a speed of a moving object with respect to the device based on a plurality of distances measured by at least one time-of-flight sensor, wherein an acquisition time of at least one of the measured plurality of distances precedes a time of activation of the image acquisition cycle;
     estimates a distance between the device and the moving object at an effective image acquisition time based on the estimated speed of the moving object and a period of time between the time of activation of the image acquisition cycle and the effective image acquisition time; and
     controls acquisition of an image of the moving object at the effective image acquisition time, the controlling including setting a focus to acquire the image of the moving object at the effective image acquisition time based on the estimated distance.

9. The device of claim 8, comprising:
   objective optics including at least one lens, wherein the circuitry sets the focus by outputting a control signal to set a position of the at least one lens.

10. The device of claim 9, comprising:
    image acquisition circuitry, which, in one mode of operation, acquires images of moving objects; and
    an actuator, which, in operation, actuates an image acquisition cycle of the image acquisition circuitry.

11. The device of claim 10, comprising the at least one time-of-flight sensor.

12. The device according to claim 11 wherein the at least one lens comprises a first field of view and the at least one time-of-flight sensor comprises a second field of view covering at least one third of the first field of view.

13. The device according to claim 11 wherein the image acquisition circuitry comprises a motor having a plurality of states of progression each corresponding to a focusing range of the objective optics.

14. The device of claim 13 wherein the at least one time-of-flight sensor has a maximum range of detection and the maximum range of detection of the at least one time-of-flight sensor is at least 65% of a maximum focusing range of the objective optics.

15. The device of claim 8, comprising at least one of:
a touch screen; and
mobile telephone circuitry.

16. A system, comprising:
at least one time-of-flight sensor;
image acquisition circuitry, which, in operation, acquires images of objects;
objective optics including at least one lens; and
auto-focus circuitry, which, in operation:
 measures a plurality of distances using the at least one time-of-flight sensor; and,
 during an image acquisition cycle,
  estimates a speed of a moving object relative to the objective optics based on the plurality of distances measured by the at least one time-of-flight sensor, wherein an acquisition time of at least one of the measured plurality of distances precedes a time of activation of the image acquisition cycle;
  estimates a distance between the objective optics and the moving object at an effective image acquisition time based on the estimated speed of the moving object and a period of time between the time of activation of the image acquisition cycle of the image acquisition circuitry and the effective image acquisition time; and
  sets a focus of the at least one lens based on the estimated distance.

17. The system of claim 16, comprising at least one of:
a touch screen; and
mobile telephone circuitry.

18. The system of claim 16, wherein the auto-focusing circuitry comprises a motor, the motor having a plurality of states of progression each corresponding to a focusing range of the objective optics.

19. The system of claim 18 wherein the at least one time-of-flight sensor has a maximum range of detection and the maximum range of detection of the at least one time-of-flight sensor is at least 65% of a maximum focusing range of the objective optics.

20. A non-transitory computer-readable memory medium containing contents which when executed by an image acquisition device cause the image acquisition device to perform a method, the method comprising:
 measuring a plurality of distances using at least one time-of-flight sensor;
 estimating, during an image acquisition cycle of the image acquisition device, a speed of a moving object in a field of view of the image acquisition device based on the plurality of distances measured by the at least one time-of-flight sensor of the image acquisition device, wherein an acquisition time of at least one of the measured plurality of distances precedes a time of activation of the image acquisition cycle;
 estimating, during the image acquisition cycle, a distance between the image acquisition device and the moving object at an effective image acquisition time based on the estimated speed of the moving object and a period of time between the time of activation of the image acquisition cycle of the image acquisition device and the effective image acquisition time;
 setting, during the image acquisition cycle, a focus of the image acquisition device based on the estimated distance; and
 acquiring, during the image acquisition cycle, an image of the moving object at the effective acquisition time using the focus set by the image acquisition device.

21. The non-transitory computer-readable memory medium of claim 20 wherein the setting the focus of the image acquisition device comprises setting a position of at least one lens of objective optics of the image acquisition device.

22. The non-transitory computer-readable memory medium of claim 21 wherein the image acquisition device comprises a motor having a plurality of states of progression each corresponding to a focusing range of the objective optics.

23. The non-transitory computer-readable memory medium of claim 22 wherein the at least one time-of-flight sensor has a maximum range of detection and the maximum range of the at least one time-of-flight sensor is at least 65% of a maximum focusing range of the objective optics.

* * * * *